(12) United States Patent
Kubo et al.

(10) Patent No.: US 7,273,186 B2
(45) Date of Patent: Sep. 25, 2007

(54) FUEL INJECTION DEVICE

(75) Inventors: Kenichi Kubo, Higashimatsuyama (JP); Eiji Hoshikawa, Higashimatsuyama (JP)

(73) Assignee: Bosch Automotive Systems Corp., Stuttgart (DE)

( * ) Notice: Subject to any disclaimer, the term of this patent is extended or adjusted under 35 U.S.C. 154(b) by 30 days.

(21) Appl. No.: 10/542,685

(22) PCT Filed: Jun. 3, 2004

(86) PCT No.: PCT/JP2004/008048

§ 371 (c)(1), (2), (4) Date: Mar. 29, 2006

(87) PCT Pub. No.: WO2004/109092

PCT Pub. Date: Dec. 16, 2004

(65) Prior Publication Data

US 2006/0226252 A1   Oct. 12, 2006

(30) Foreign Application Priority Data

Jun. 4, 2003 (JP) .............................. 2003-159318

(51) Int. Cl.
  *F02M 61/10* (2006.01)
  *F02M 47/02* (2006.01)
  *F02M 59/00* (2006.01)
  *B05B 1/30* (2006.01)

(52) U.S. Cl. .................. 239/88; 239/89; 239/533.2; 239/585.1; 239/585.3; 239/585.4; 239/585.5; 239/533.11

(58) Field of Classification Search ............... 239/88, 239/89, 91, 533.2, 533.9, 533.11, 585.1, 585.3, 239/585.4, 585.5; 251/129.15, 129.21, 127
See application file for complete search history.

(56) References Cited

U.S. PATENT DOCUMENTS 5,192,048 A * 3/1993 Wakeman .............. 251/129.16
5,921,475 A * 7/1999 DeVriese et al. ......... 239/585.4
6,264,112 B1 * 7/2001 Landschoot et al. ........... 239/5
6,328,232 B1 * 12/2001 Haltiner et al. .......... 239/585.1

FOREIGN PATENT DOCUMENTS

JP   64-36970      2/1989
JP   42524/1992    1/1994
JP   2001-295958   10/2001

* cited by examiner

Primary Examiner—Davis Hwu
(74) Attorney, Agent, or Firm—Kenyon & Kenyon LLP

(57) ABSTRACT

In a fuel injector (1) configured so that fuel injection is controlled by a solenoid valve (4), the solenoid valve (4) comprises an electromagnet (43), an armature bolt (41) that has a ball (42) and a plate member (41A) attached thereto and is spring-biased in the valve closing direction by a spring member (48), a stopper member (49) that limits movement of the plate member (41A) in order to limit the maximum stroke of the ball (42) and an armature plate (44) through which the armature bolt (41) passes and which collaborates with the solenoid valve (4), the contact area (S2) between the armature plate (44) and the plate member (41A) being made larger than the contact area (S1) between the plate member (41A) and the stopper member (49).

8 Claims, 2 Drawing Sheets

FUEL INJECTION DEVICE

TECHNICAL FIELD

The present invention relates to a magnetically operated fuel injector used to feed fuel to an internal combustion engine by injection.

BACKGROUND ART

As a fuel injector used in a system like the common rail system for supplying fuel to a cylinder of an internal combustion engine by direct injection there is known, for example, a fuel injector of the type taught by Unexamined Japanese Patent Application JP-A-64-36970. This fuel injector is configured to start fuel injection by energizing and opening a solenoid valve to communicate a backpressure chamber in the injector body with a low-pressure site, thereby removing the backpressure of a valve piston to enable lift of a needle valve, and then after elapse of a prescribed time, deenergizing the solenoid valve to terminate the communication between the backpressure chamber and low-pressure site, thereby causing a prescribed backpressure to act on the valve piston so as to press down the needle valve and halt the injection of fuel.

In order to achieve speedy fuel injection and accurate control in this type of fuel injector it is therefore necessary to improve the electrical operating characteristics of the solenoid valve. One method for this that can be mentioned is to improve the magnetical characteristics of the solenoid valve armature plate by selecting a material of relatively low hardness as the material of the armature plate.

However, when a material of low hardness is used as the material of the armature plate, wear of the armature plate when it strikes the stopper becomes large, which gives rise to the problem of shortened injector service life. It is conceivable to overcome this problem by adopting a structure that enlarges the contact area between the armature plate and the stopper. However, when this contact area is increased, the state of engagement when the two member contact becomes unstable, so that variance in the injection characteristics tends to expand and, in addition, a problem of reduced operating speed arises owing to greater damping effect.

An attempt to overcome these problems by a structure that makes the stopper a separate body from the bolt gives rise to a problem of runout relative to the shaft center, so that a problem arises of it becoming difficult to maintain parallelism between the magnet core and the armature plate at the prescribed level.

An object of the present invention is to provide an improved fuel injector capable of overcoming the aforesaid problems of the prior art.

Another object of the present invention is to provide a fuel injector that affords a high degree of flexibility in selecting the material of the armature plate.

Another object of the present invention is to provide a fuel injector that is long in service life and excellent in the electrical operating characteristics of the solenoid valve.

DISCLOSURE OF THE INVENTION

The present invention adopts a structure wherein the armature plate and armature bolt are made separate bodies, whereby the contact area between the armature plate and the armature bolt can be made large relative to the contact area with the stopper that limits the stroke of the armature bolt.

One feature of the present invention resides in the point that in a fuel injector constituted of a nozzle body and a solenoid valve attached to a nozzle holder and configured so that injection of fuel from the nozzle body is controlled by the solenoid valve, the solenoid valve comprises an electromagnet equipped with a magnetic pole, an armature bolt having a valve member attached at one end and formed at its other end with a head portion, a support/guide member for supporting and guiding the armature bolt to enable it to move toward and away from the magnetic pole, a spring member for spring-biasing the valve member in the direction of valve closing, a stopper member disposed opposite the head portion for limiting a maximum stroke of the valve member and an armature plate through which the armature bolt passes so as to locate it between the head portion and the valve member and which collaborates with the electromagnet to move the armature bolt toward the stopper member against the spring force of the spring member, the contact area between the armature plate and the head portion being larger than the contact area between the head portion and the stopper member. Thus a high degree of flexibility is afforded in selecting a material for the armature plate that enables improvement of the operational responsivity and stability of the solenoid valve, so that a fuel injector that is long in service life and excellent in the electrical operating characteristics of the solenoid valve can be provided.

BEST MODE OF CARRYING OUT THE INVENTION

In order to set forth the present invention in greater detail, an explanation will now be made based on the attached drawings.

Figure 1:
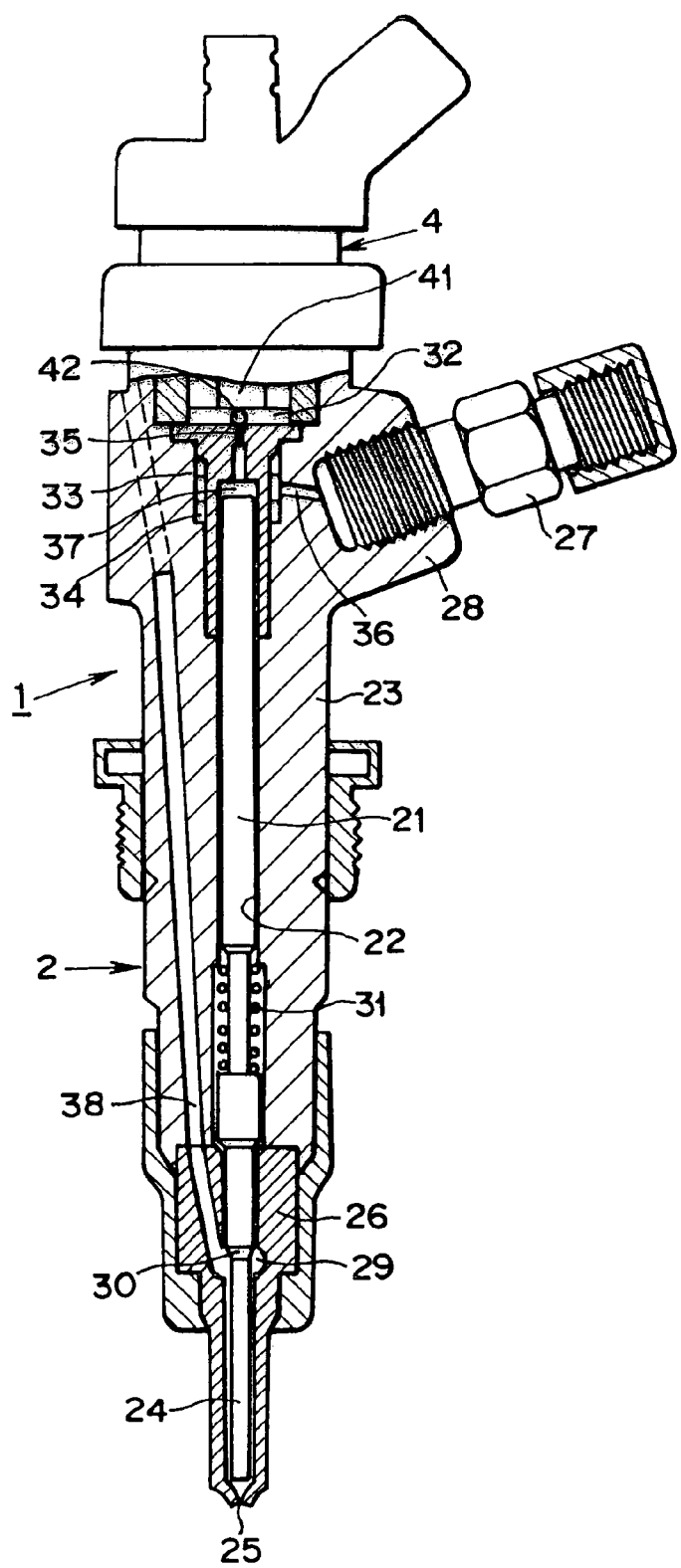
FIG. 1 is a cross-sectional view of an embodiment of the present invention.

FIG. 1 is a cross-sectional view of an embodiment of the fuel injector according to the present invention. Reference numeral 1 designates a common rail fuel injector for supplying fuel to a diesel internal combustion engine by injection. The fuel injector 1 is installed at a cylinder of an unshown diesel internal combustion engine and used to feed required amounts of high-pressure fuel supplied from an unshown common rail into a cylinder at prescribed timing; it is constituted by installing a nozzle body 26 and a solenoid valve 4 in a nozzle holder 2.

The nozzle holder 2 is provided internally with a hollow body 23 having a guide hole 22 in which a pressure pin 21 slides. The hollow body 23 is connected to the nozzle body 26, at whose extremity is a nozzle hole 25 closed by the tip of a nozzle needle 24 connected to the pressure pin 21.

The hollow body 23 has a port 28 for connection with an intake fitting 27 connected to an unshown high-pressure fuel supply pump. The supplied fuel is led to a fuel reservoir 29 through an internal fuel line and the nozzle needle 24 is formed with a tapered portion 30 on which the pressurized fuel in the fuel reservoir 29 acts. A nozzle spring 31 works to press the pressure pin 21 and nozzle needle 24 downward.

Therefore, when the pressure pin 21 is pressed downward to compress the nozzle spring 31 and hold the nozzle needle 24 at the position of closing the nozzle hole 25 of the nozzle body 26, no fuel is jetted from the fuel injector 1.

The hollow body 23 is provided with a head 33 formed with a downward-facing drain chamber 32 that is concentric with the guide hole 22 and extends in the axial direction of the hollow body 23. The head 33 is formed with a control chamber 37 that communicates with a radial supply path 34 and an axial drain path 35. The supply path 34 communicates with the intake fitting 27 through an axial path 36 in hollow body 23 and the bottom of the control chamber 37 is formed by the upper surface of the pressure pin 21.

The fuel reservoir 29 is supplied with high-pressure fuel through a passage 38. On the one hand, the configuration is such that when the control chamber 37 is supplied with high-pressure fuel but the drain path 35 is communicated with a fuel low-pressure site by the solenoid valve 4 as explained later, the fuel pressure of the control chamber 37 is lower than the fuel pressure of the fuel reservoir 29. The area of the upper surface of the pressure pin 21 is formed to be larger than the surface of the tapered portion 30, so that when the drain path 35 is closed by the solenoid valve 4 and the control chamber 37 is filled with high-pressure fuel, the resulting backpressure acting on the nozzle needle 24 holds the nozzle needle 24 at the position of closing the nozzle hole 25 and fuel injection is not conducted.

On the other hand, when the solenoid valve 4 opens, the fuel pressure of the control chamber 37 escapes to the fuel low-pressure site through the drain path 35, making the fuel pressure of the control chamber 37 lower than the fuel pressure of the fuel reservoir 29, whereby the backpressure acting on the nozzle needle 24 is released, and since the nozzle needle 24 therefore retracts to be held at a position of opening the nozzle hole 25, fuel injection is conducted.

The solenoid valve 4 is provided integrally with the nozzle holder 2 in order to control the fuel pressure of the control chamber 37 and thus control the starting and stopping of fuel injection in the foregoing manner.

The solenoid valve 4 is configured to open and close the open end of the drain path 35 using a ball 42 retained at the tip of an armature bolt 41 to function as a valve member. Here, when the solenoid valve 4 is not energized, the open end of the drain path 35 is blocked by the ball 42, and since the control chamber 37 is therefore filled with high-pressure fuel, the pressure pin 21 causes the nozzle needle 24 to close the nozzle hole 25 and fuel injection is not conducted.

To the contrary, when the solenoid valve 4 is energized, the ball 42 separates from the open end of the drain path 35 so that the high-pressure fuel in the control chamber 37 escapes to the low-pressure site through a bush (not shown) and a drain connector (not shown) to lower the fuel pressure in the control chamber 37 and enable fuel injection. Then when energization of the solenoid valve 4 is discontinued, fuel injection is terminated because the nozzle needle 24 is returned to the position of closing the nozzle hole 25.

Figure 2:
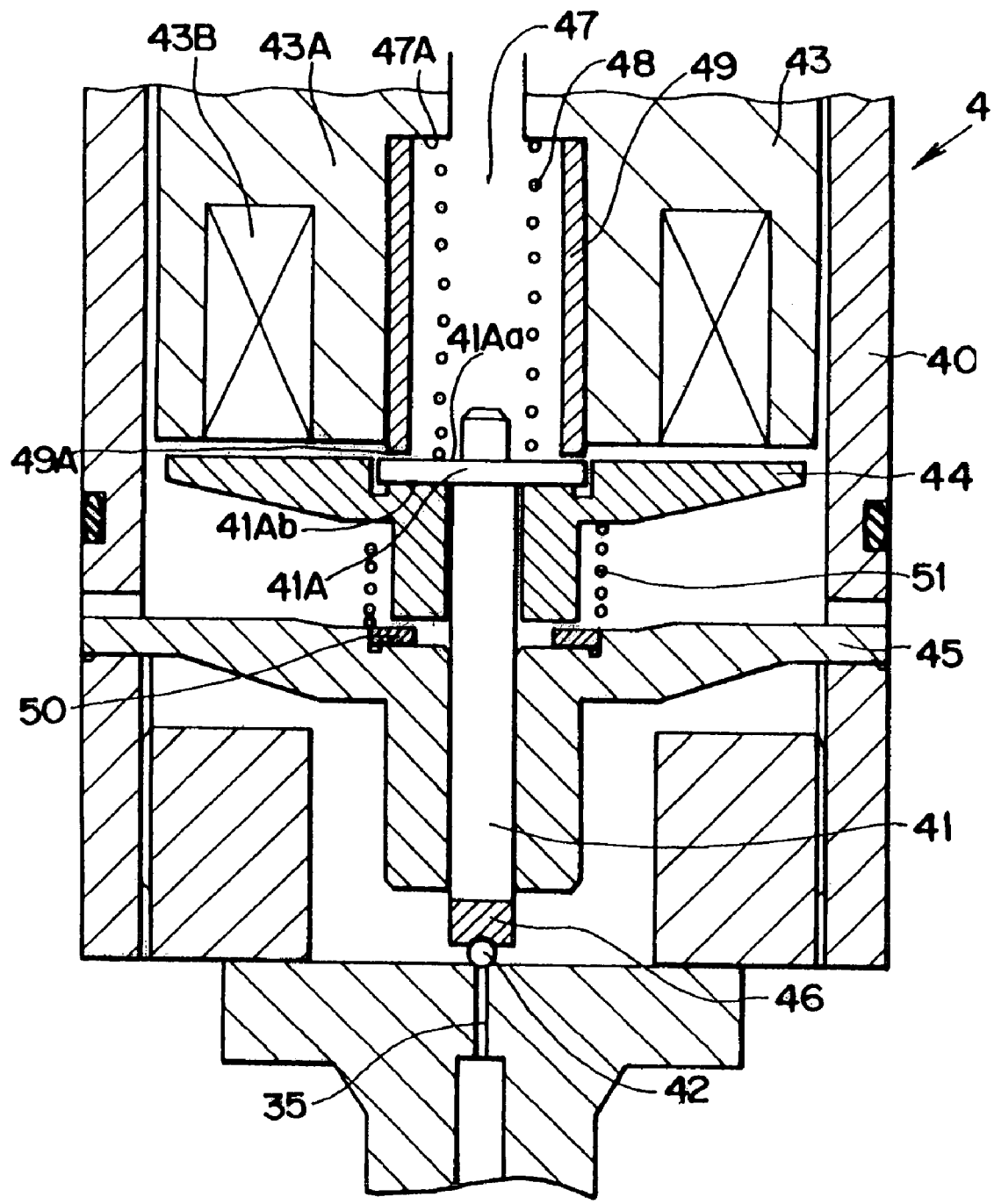
FIG. 2 is a detailed sectional diagram showing an essential portion of the solenoid valve of FIG. 1 in detail in a cross-sectional view.

The essential portion of the solenoid valve 4 is shown in detail in FIG. 2. The solenoid valve 4 comprises an electromagnet 43, an armature plate 44 and the armature bolt 41, which are accommodated in a casing 40 as illustrated. The electromagnet 43 is of the conventional configuration having a solenoid coil 43B installed in a magnetic pole 43A of approximately cylindrical shape and is configured to magnetically attract the armature plate 44 when exciting current is supplied to the solenoid coil 43B.

The armature bolt 41 is disposed in concentric alignment with the electromagnet 43 and is supported and guided by a support/guide member 45 fastened to the casing 40 so as to be movable in the axial direction, i.e., so as to be capable of moving toward and away from the magnetic pole 43A. The ball 42 for closing the drain path 35 is fastened to one end of the armature bolt 41 by means of a ball holder 46. The ball 42 is a member that functions as a valve member and can be attached to the armature bolt 41 by an appropriate means.

A head portion is formed at the other end of the armature bolt 41. This head portion is formed by securely fastening a plate member 41A to the other end of the armature bolt 41 by screw engagement, welding, male-female fitting or other suitable means. It should be noted that a structure that integrally forms the head portion with the other end of the armature bolt 41 is of course also possible.

A cylindrical space 47 is formed at the center portion of the magnetic pole 43A and a spring member 48 and stopper member 49 are provided in the space 47. Here the spring member 48 is an expansion coil installed between a shoulder portion 47A of the space 47 and the plate member 41A as a means for energizing the ball holder 46 constituting a valve member in the valve closing direction.

The stopper member 49 is a sleeve-like member fitted in the space 47 that is made of a high wear-resistance metal. The stopper member 49 is attached to the magnetic pole 43A so that the lower end 49A thereof protrudes slightly from the magnetic pole 43A. The stopper member 49 is installed so that a gap of prescribed length arises between the lower end 49A of the stopper member 49 and the upper surface 41Aa of the plate member 41A when the ball 42 is in the positional state shown in FIG. 1 of blocking the drain path 35. This structure limits the stroke of the ball 42, i.e., the stroke of the armature bolt 41, to a prescribed length. In other words, the stopper member 49 constitutes a stopper member disposed opposite the plate member 41A for limiting the maximum stroke of the ball holder 46.

The armature plate 44, through which the armature bolt 41 extending between the plate member 41A and the ball 42 passes, can move in the axial direction along the armature bolt 41. Moreover, an expansion coil 51 is provided between a washer 50 mounted on the support/guide member 45 and the armature plate 44. The expansion coil 51 has a smaller spring force than the spring force of the spring member 48; it has the spring force required for abutting the armature plate 44 onto the lower surface 41Ab of the plate member 41A but is a small spring force of a degree that does not hinder the action of the spring member 48.

Moreover, the configuration is such that the contact area S1 between the lower end 49A of the stopper member 49 and the upper surface 41Aa of the plate member 41A is smaller than the contact area S2 between the lower surface 41Ab of the plate member 41A and the armature plate 44.

Owing to the foregoing structure of the solenoid valve 4, when the solenoid coil 43B is not supplied with exciting current, the armature bolt 41 is spring-biased by the spring member 48 and the solenoid valve 4 assumes a valve closed state with the ball holder 46 in close contact with the opening of the drain path 35. At this time, the armature plate 44 is pressed in contact with the lower surface 41Ab of the plate member 41A by the spring force of the expansion coil 51.

When exciting current passes through the solenoid coil 43B, the magnetic attraction force of the electromagnet 43 moves the armature plate 44 toward the electromagnet 43, at which time the armature bolt 41 is moved toward the electromagnet 43. The armature plate 44 moves the armature bolt 41 toward the electromagnet 43 until the upper surface 41Aa of the plate member 41A contacts the lower end 49A of the stopper member 49. As a result, the solenoid valve 4 assumes a valve open state with the ball 42 separated from the opening of the drain path 35 by the aforesaid prescribed length.

As set out in the foregoing, the contact area S1 is set smaller than the contact area S2. Therefore, even if the electrical characteristics of the solenoid valve 4 should be improved by using an armature plate 44 made of a material of low hardness such as a low-carbon soft magnetic material, magnetic stainless steel or the like, the effect of wear between the plate member 41A and armature plate 44 can be reduced to the same level as or smaller than the effect of wear between the plate member 41A and the stopper member 49.

As a result, even if a low-hardness material excellent in magnetical characteristics is used as the material of the armature plate 44, wear at the two locations of the stopper portion can, as stated above, be brought into a balanced wear state. From this it follows that a high degree of flexibility can be afforded in selecting a material for the armature plate 44 that enables improvement of the operational responsivity and stability of the solenoid valve. In addition, merits can be realized in the points of lower variance among individual products and ease in achieving a minimum quantity of fuel injection.

INDUSTRIAL APPLICABILITY

As set out in the foregoing, the fuel injector according to the present invention affords marked flexibility in selecting the material of the armature plate and, as such, helps to improve the characteristics of the fuel injector.

The invention claimed is:

1. A fuel injector constituted of a nozzle body and a solenoid valve attached to a nozzle holder and configured so that injection of fuel from the nozzle body is controlled by the solenoid valve, which fuel injector is characterized in that:

the solenoid valve comprises an electromagnet equipped with a magnetic pole, an armature bolt having a valve member attached at one end and formed at its other end with a head portion, a support/guide member for supporting and guiding the armature bolt to enable it to move toward and away from the magnetic pole, a spring member for spring-biasing the valve member in the direction of valve closing, a stopper member disposed opposite the head portion for limiting a maximum stroke of the valve member and an armature plate through which the armature bolt passes so as to locate it between the head portion and the valve member and which collaborates with the electromagnet to move the armature bolt toward the stopper member against the spring force of the spring member, the contact area between the armature plate and the head portion being larger than the contact area between the head portion and the stopper member.

2. A fuel injector as claimed in claim 1, wherein the stopper member is a cylindrical member installed in the magnetic pole and one end surface of the cylindrical member contacts the head portion to define the maximum displacement of the valve member in the valve opening direction.

3. A fuel injector as claimed in claim 2, wherein the cylindrical member is disposed in a cylindrical space formed in the magnetic pole.

4. A fuel injector as claimed in claim 3, wherein the spring member is a coil spring and the coil spring is disposed to be accommodated in the cylindrical member.

5. A fuel injector as claimed in claim 1, further comprising an expansion coil of smaller force than the spring member, for pressing the armature plate into contact with the head portion.

6. A fuel injector as claimed in claim 5, wherein the expansion coil is provided between the armature plate and the support/guide member.

7. A fuel injector as claimed in claim 5, wherein the head portion is a plate member provided at one end of the armature bolt.

8. A fuel injector as claimed in claim 7, wherein a portion of the armature plate is adapted to press into contact with the plate member.

* * * * *